Aug. 4, 1936.  F. L. O. WADSWORTH  2,049,786
GLASS FEEDER
Filed Aug. 28, 1933
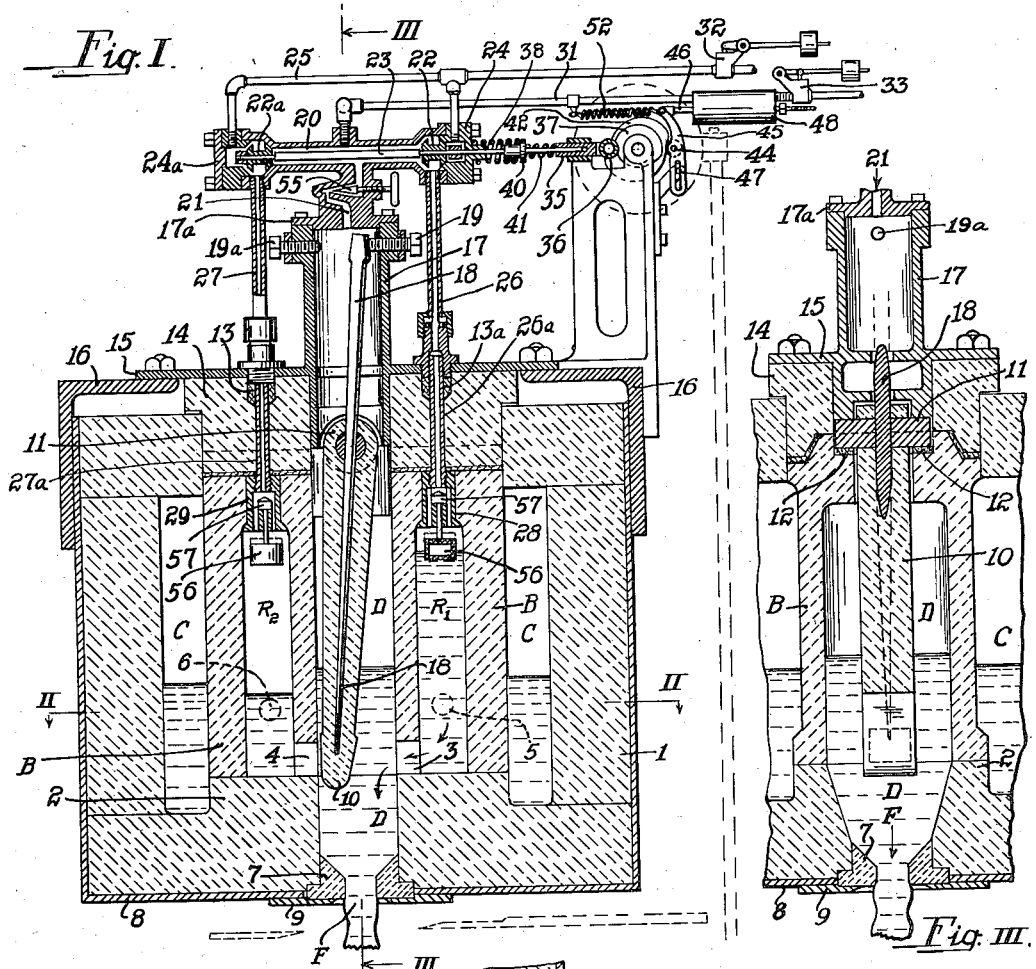
Fig. I.
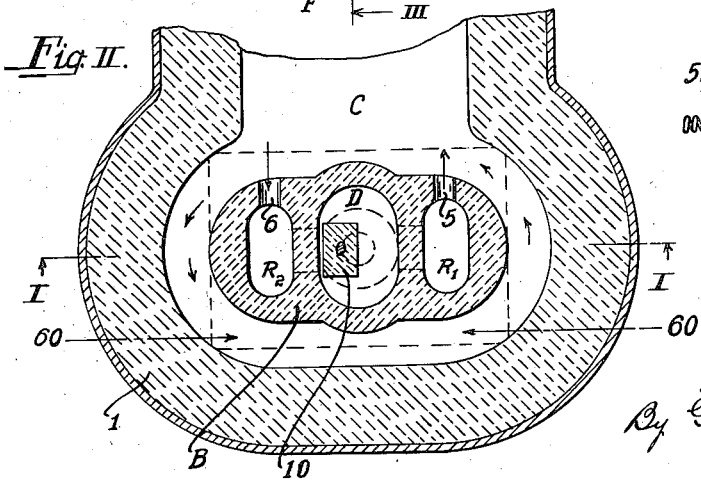
Fig. II.
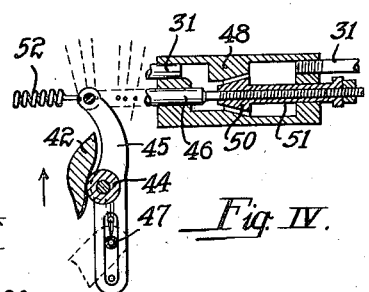
Fig. IV.
INVENTOR
Frank L. O. Wadsworth
By Green & McCallister
his Attorneys Patented Aug. 4, 1936

2,049,786

UNITED STATES PATENT OFFICE 2,049,786

GLASS FEEDER

Frank L. O. Wadsworth, Pittsburgh, Pa., assignor to Ball Brothers Company, Muncie, Ind., a corporation of Indiana Application August 28, 1933, Serial No. 687,042

39 Claims. (Cl. 49—55)

My invention relates to automatic glass feeders of the forced flow type, and one of its principal objects is to substantially increase the rate of feed of the molten material by subjecting it to a continuously applied force which supplements, and complements, the action of gravity in extruding the glass from a submerged delivery orifice; and which eliminates any loss of time due to the unusual decelerations, or retardations, or retractions, of the outflowing stream, that are caused by periodic interruptions or reversals of the extruding force or forces. My improved mode of operation is in this respect fundamentally different from that which characterizes the ordinary species of periodic impulse feeders—of either the reciprocating plunger or the fluid pressure types—in which the glass above the flow orifice is alternately subjected to accelerating and decelerating forces, that act successively to assist and oppose the natural (gravity) flow of the glass from the body of the material above the delivery opening, and thus produce a series of intermittently interrupted discharges, separated by substantial time intervals. It is the purpose of my invention to eliminate these successive interruptions of flow, and thus avoid the loss of time occasioned thereby, and also avoid, or minimize, attendant difficulties that accompany such periodic cessations, and/or reversals of motion of molten material.

Another object of my present improvements is to periodically change the degree or intensity of the constantly acting extrusion force, or forces, in such manner as to produce rhythmic pulsations, or variations, in the rate of delivery of the continuously flowing stream—that will result in corresponding increases and decreases in its diameter or cross section—and thus produce a uniform succession of "sausage shaped" portions, (of the form best adapted to fill a series of receiving receptacles or molds), which are linked together by a corresponding succession of much shorter "necked in" sections of the stream, that may be readily severed, by suitable shear mechanism, without distorting, or chilling, the flowing material, and without sensibly checking its normal delivery movement.

It should be noted that I do not employ the term "necked in" in the sense it is ordinarily employed in this art, or to mean a portion which is reduced in diameter because of a reversal or even a cessation of flow, but I do employ it to mean a link-like portion of the flowing stream which is of less cross-sectional area than adjoining portions.

A further object of this invention is to provide a "segregation", or delivery chamber, which contains, or is connected with, the discharge orifice of the feeder, and which is continuously supplied with glass from a plurality of auxiliary reservoirs that are in constant and uninterrupted communication with a main or parent body of the molten material, and are successively put into communication with the segregation chamber;—thus permitting one of the said auxiliary reservoirs to be replenished from the parent body while another is supplying glass to the delivery member.

Still another object of my invention is to provide automatic and self actuating, or self controlled, means for regulating or limiting the flow of glass into the auxiliary supply reservoirs, and from these reservoirs to the delivery (segregation) chamber, and thereby establishing and maintaining uniform conditions of operation, without manual adjustment of the operating parts.

Other objects, and advantages, of these improvements will be made manifest by an examination of the accompanying drawing and description of one form of feeder which is here presented as exemplary, or illustrative, of many alternative constructions that may embody or exemplify my present invention, but which is not to be considered as limiting, or restricting its application to other designs of structure, or to other allied modes of use. In the illustrative drawing:

Fig. I is a transverse vertical cross section through the axis of the delivery orifice of the feeder;

Fig. II is a horizontal cross section on the plane II—II of Fig. I;

Fig. III is a longitudinal section on the plane III—III of the same figure; and

Fig. IV is an enlarged vertical section of a part of the structure shown in Fig. I.

In the construction here illustrated the parent pool or mass, from which the molten material is to be fed, is contained in a forehearth 1, that extends out from the front of a large melting tank (not shown), and is provided, near its forward end, with an oval delivery chamber D, whose lower portion is preferably formed in a raised part 2 of the forehearth floor, and whose upper portion is formed by a central cavity in a superimposed "bell" member B. This bell is also provided with two other chambers $R_1$ and $R_2$, which are positioned one on each side of the chamber D, and communicate therewith through the ports 3 and 4 (see Fig. I); and which are also in constant communication with the body of glass in the forehearth space C, through the smaller port, or supply passages 5 and 6 (see Fig. II). The lower end of the delivery chamber (D) is partially closed by a removable flow bushing, or ring, 7, which contains the delivery orifice F, and which is held in position against the bottom of the forehearth "boot", or frame, 8 by the plate 9.

The port openings 3 and 4—each of which is of substantially greater cross sectional area than the delivery orifice F—are controlled by a swinging gate valve 10 which is carried by the trunnion shaft 11 and which is pivotally supported (on the graphite blocks 12—12), in the upper flanged head of the bell B. This flanged head is preferably rectangular in form (as indicated by dotted lines in Fig. II) and is covered by a flanged roof block 14, which is held down on the bell B (and which also serves to press the lower end of the latter against the floor block 2) by the cover plate casting 15 that is removably bolted to the angle supports 16—16 on the forehearth frame 8. The cover member 15 is provided with a central dome 17, whose lower end extends down through the center of the roof block 14 and engages the projecting ends of the trunnion shaft 11 to hold the latter against the graphite bearing blocks 12—12. The shaft 11 is cross drilled to receive a rod 18, whose lower portion is preferably tapered, and which extends down through the center of the refractory gate valve member 10; and whose top portion projects upwardly into the dome 17 and is engaged by adjustable stop screws 19—19ª, that serve to limit the swinging movement of the valve 10, and prevent it from coming in contact with the inner faces of the delivery chamber D.

The upper end of the dome 17 is covered by a detachable head 17ª, that is provided with a transversely extending pipe chamber 20, which is connected to the interior of the dome 17, by the passageway 21, and which is enlarged at its outer ends to receive two double headed poppet valves 22—22ª that are slidably mounted on, and operatively connected by, the stem 23. The enlarged ends of the tubular chamber 20 are covered by removable caps 24—24ª, which are connected in parallel with a conduit 25, that leads to a suitable source (not shown) of sub-atmospheric (vacuum) pressure; and these ends are also detachably coupled by the pipes 26—27, to the tubular bolts 26ª—27ª, which project downwardly, through the cover plate 15 and the roof block 14, and are engaged, at their lower extremities, by nichrome sleeve nuts 28 and 29, that are embedded in the upper walls of the auxiliary reservoir chambers R₁ and R₂, in the bell B. The hollow bolt and nut elements 26ª—28 and 27ª—29, serve to assist the cap or cover plate 15 in clamping the roof block and bell members 14—B tightly together, and in holding these assembled parts in sealed relation to each other and to the supporting floor block 2; and they also serve, in conjunction with the pipe connections 26—27, as communicating conduits between the chambers R₁ and R₂ and 20. The central portion of the chamber 20 is connected to a second conduit 31 that leads to a source of super-atmospheric pressure. Each of the conduits 25 and 31 is preferably provided with a sensitive relief valve (e. g. 32 and 33), which can be adjusted to open to the atmosphere whenever the pressure in these conduits respectively falls below, or rises above, a predetermined value, and which therefore serve to maintain these pressures at a uniform and constant gauge reading provided only that the capacities of the two sources of supply are in excess of the withdrawal requirements.

The stem 23 of the valve assembly 22—22ª projects through the head 24, and is elastically engaged, at its outer end, with a sleeve 35, which carries a roller 36, that bears against a revolving cam 37. The valve system is moved in one direction—(e. g. to the right as viewed in Fig. I)—by the spring 38, which is interposed between the head 24 and a fixed collar 40 on the valve stem 23; and in the opposite direction by the cam 37 and the spring 41, which is interposed between the collar 40 and the sleeve 35, and which is much stronger and stiffer than the spring 38, but which is normally free from compression, when the parts are in the position shown in Fig. I. The shaft to which the cam 37 is secured is driven at a predetermined constant speed, from any suitable variable speed motor, (e. g. by the worm wheel and worm connections shown in dotted lines in Fig. I); and is also provided with a second cam 42, which engages with a cam roller 44 on the valve lever 45, that is pivotally suspended, at its upper end, on a piston valve stem 46, and is slotted at its lower end to receive a vertically adjustable fulcrum pin 47. The valve stem 46 passses through the front head of a valve box 48 which is inserted in the pipe line 31 (between the relief valve 33 and the chamber 20), and is connected to a tapered valve element 50—(which can be axially adjusted on the stem 46 by means to the threaded sleeve 51)—that serves to control the flow of compressed fluid through the valve box (see Fig. IV).

The operation of the parts thus far described is as follows: When the cam actuated valve elements 22—22ª—23—35 etc. and 45—46—50 etc., are in the position shown in Figs. I and IV, the chambers D and R₁ are both in communication with the pressure supply conduit 31; and the chamber R₂ is in communication with the vacuum connection 25. The super-atmospheric pressure on the glass in the chambers D and R₁ will then assist the action of gravity in accelerating the outflow of the molten material through the delivery orifice F; and the sub-atmospheric pressure in the chamber R₂ will concurrently serve to draw a fresh quota of glass from the parent body through the small supply port 6, and raise the level of the molten material in this chamber (R₂). In this stage of the operation the valve 10 will be automatically held against the inner end of the port opening 4—(but prevented from making physical contact with the adjacent wall of the bell by the stop screw 19)—by the combined effect of the pressure in the chamber D and the suction in the chamber R₂; thus preventing any sensible movement of the glass through this opening (4). The concurrent actions, of expelling the glass from the delivery chamber D, and of accumulating a fresh supply in the reservoir R₂, continue until the rotation of the cam 37 brings its raised segment into engagement with the cam roller 36, and thus forces the valve assembly 22—22ª to the left (by the compression of the heavy spring 41); and thereby reverses the connections between the vacuum and pressure conduits 25 and 31, and the reservoir chambers R₂ and R₁, without affecting the continuous connection between the pressure conduit 21—20 and the central delivery chamber D. The reversal of the pressure conditions in R₁ and R₂ causes the gate valve 10 to immediately swing to the right, toward the port opening 3, and thus simultaneously open communication between the chambers R₂ and D and cut off communication between D and R₁. The super-atmospheric pressure now acting on the accumulated glass in the reservoir R₂ forces the accumulation through the wide open port 4 into the central delivery chamber (D) and cooperates with the pressure maintained therein, in expelling the glass therefrom through the delivery orifice (F); while the sub-atmospheric (vacuum) pressure now established in the reservoir R₁ is acting to draw a fresh quota of the molten material thereinto through the supply passageway 5. This phase of action continues until the continual (clockwise) rotation of the cam 37 carries its raised segment out of engagement with the cam roller 36, thus relieving the pressure on the spring 41 and permitting the valve assembly 22—22ª to be again shifted to the right by the spring 38; thereby reestablishing the first described conditions of operation.

The continued periodic reversal of "pumping" action in the auxiliary chambers (R₁ and R₂)—in alternately drawing fresh quotas of glass into those chambers through the supply passages 5 and 6, and then discharging these accumulations into the central delivery chamber through the valve controlled ports 3 and 4—results in the maintenance of a continual discharge of the molten material through the delivery orifice (F), under the combined influence of gravity and of a controlled super-atmospheric pressure on the glass in the delivery chamber thereabove; and thus eliminates the cessation, or reversal, of this discharge, which accompanies, and is characteristic of, the operation of the usual forms of "forced flow" feeders (of either the reciprocating plunger or the fluid pressure (air) type). This continuous outflow, or feed, of glass, which is one distinguishing feature of my improved mode of procedure, very substantially augments the average rate of discharge of the material through a delivery orifice (F) of any predetermined size; and thus increases the capacity of the feeder in supplying a series of severed or separated charges to the receiving molds of a forming machine. It also avoids, or minimizes, difficulties which are attendant upon periodic interruptions of a flow of hot viscous material—such as may be caused by the chilling and stiffening of the molten glass during the intervals of arrested or reverse flow, or may be due to a change in the frictional resistance to movement through the discharge orifice—and thus assists in the maintenance of constant temperature conditions in the outflowing stream of glass, and in the formation and delivery of a series of mold charges of uniform shape and weight. The maintenance of a uniform temperature and of a constant weight in the successively delivered "gobs" of hot glass is particularly important in the most effective operation of a high speed forming machine, in which these masses are to be subsequently fabricated; and it is in conjunction with the use of such apparatus that my present invention is most useful and advantageous.

In order to control the degree or intensity of the expulsion force on the glass in the delivery chamber, during different stages in each complete cycle of individual charge formation,—and thus change the rate of extrusion, and the resultant size of the outflowing stream at successive points in such formation—I also provide means for automatically varying the pressure of the air in the supply conduits 31—20 during each such cycle. In the illustrative construction herein shown this last mentioned means comprises the valve mechanism, 45—46—47—48—50—51 etc., which is actuated and controlled by the revolving cam 42 and the return spring 52. The cam 42 is preferably so set, with respect to its companion cam 37, that the valve element 50 is returned to its forward position—to throttle or restrict the flow of compressed air to the chamber 30—just before the cam 37 acts to reverse, or permit the reversal of, the valve assembly 22—22ª; so that the extrusion of glass from the delivery orifice is thus momentarily diminished, and the continuously flowing stream is temporarily reduced in diameter—close to the orifice—to form a natural "neck" at that point. The size and length of this "neck" can be readily varied and controlled by either adjusting the length of throw of the valve element 50—by shifting the fulcrum pivot 47 up or down in the slot of the valve lever 45— or by adjusting the position of this element on the valve stem 46 (by turning the threaded valve head sleeve 51 on the stem 46). As soon as the valve assembly 22—22ª is shifted—to permit a previously accumulated charge of glass to pass from one of the auxiliary reservoirs (R₁ or R₂) to the delivery chamber D, the valve 50 is further opened to increase the pressure on the glass in the connected chambers R₁ and D (or R₂ and D), and thus accelerate the discharge, and "stuff", or enlarge, the outflowing stream;—this rate of acceleration being governed in part by the shape or contour of the cam 42, and in part by the previously described adjustments of the valve mechanism 45—47—50 etc. By adjusting the position of the weight on the lever arm of the relief valve 33 I can further control and limit the maximum pressure that can be applied to the glass above the delivery orifice; and it will be readily apparent that these four conjoint or cooperative means of regulating the intensity and the rate of change of the expulsion force during each cycle of expulsion action will permit the operator to obtain a very wide range of shapes and weights of mold charges or "gobs" that may be readily separated or severed from the upper portion of the stream—preferably at the reduced neck sections—by any suitable form of "superspeed" shear mechanism, or "dropping" shear mechanism—such as is shown, for example, in my copending application Ser. No. 687,043 filed August 28, 1933, which may be actuated in synchronism with the cams 37—42 by any suitable connective mechanism. This shear mechanism forms no part of the broad features of improvement herein disclosed and claimed, and is therefore only diagrammatically indicated (by dotted lines) in Fig. I.

From the foregoing it will be apparent that I have produced a new method of forming a succession of mold charges, which may be defined as a procedure for alternately creating independent flows from a mass of molten glass, or from partially segregated portions of such mass, and then in severing a mold charge from the stream occasioned by each such flow. The procedure is well adapted to, and in fact is described and illustrated as to contribute to a severance of each mold charge from a suspended mass; and it will be understood that each charge so severed may drop or be otherwise delivered to a mold which is ordinarily one of a series mounted on a movable table so arranged that the molds of the series are successively moved to a charge-receiving position. It will, of course, be apparent that the method is not limited to a delivery of mold charges to such an arrangement of molds, and that the broad purpose is to produce a procedure for accelerating the operation of mold charge formation, by so timing the occurrence of the separate steps that the operations of forming each mold charge overlap those for forming the next successive charge.

In the procedure here under discussion the independent flows of molten material are correlated by causing the streams resulting therefrom to alternately traverse a common orifice, viz., the flow orifice F, and this in turn contributes to an arrangement wherein a single shear mechanism may be employed for accomplishing the severing operation, but it will be understood that the invention has a broader application. In its specific application the method may be described as one in which one quota of molten glass is being accumulated and at least partially segregated from a mass of such material while a mold charge is being formed and severed from a previously accumulated and at least partially segregated quota, and all under such conditions that the successive steps may cooperate to produce a succession of uniformly shaped and measured mold charges.

From this aspect the chambers D and $R_1$ cooperate in the discharge of a stream through the orifice F while the quota of glass in the previously discharged chamber $R_2$ is being replenished by subjecting the chamber $R_2$ to vacuum pressure and thereby drawing glass from the parent body or mass into it. After the mold charge is formed by a flow initiated in the chamber $R_1$, the pressure conditions are reversed and the chamber D is then segregated from the chamber $R_1$ and placed in communication with the chamber $R_2$, with the result that the fluid pressure then existing above the molten glass in the chamber $R_2$ occasions a flow from that chamber and eventually through the orifice F, while glass is being withdrawn from the parent body into the chamber $R_1$ for the purpose of replenishing the quota in that chamber. While neither of the chambers $R_1$ and $R_2$ are never wholly segregated from the parent mass, there is an effective segregation of the quotas drawn into those chambers and it will be apparent that the degree of segregation may be varied by merely varying the relative sizes of the ports 5 and 6 with relation to the ports 3 and 4, or by actually providing control members for the ports 5 and 6, consequently when I refer to segregated quotas, I use the term "segregated" in its broad sense, since my invention contemplates either a partial segregation, such as described, or a more or less complete segregation, such as is obtained between the chamber D and the chambers $R_1$ and $R_2$ by the operation of the control member 10.

When the valve system 22—22ª is shifted, in either direction, to admit a freshly accumulated charge of glass to the central delivery chamber, the level of this accumulated charge—in one of the auxiliary reservoir chambers $R_1$ and $R_2$—will be substantially higher than that of the glass in the chamber D; and the tendency of the applied pressure will be to immediately equalize these levels, and thus increase the depth of the glass above the discharge orifice F. This tendency is aided by making the passageways 3 and 4 of substantially larger area than that of the flow opening (F); and it may be further aided by placing a manually regulatable needle valve 55 in the passageway 21, and adjusting this valve until the pressure in the central chamber is somewhat less than that in the conduit 20 and the chamber ($R_1$ or $R_2$) connected therewith. Under those circumstances the level of glass in the delivery chamber D will, at the end of each accelerated expulsion cycle, be somewhat higher than in the reservoir ($R_1$ or $R_2$) then connected therewith; and the rise and fall of the molten material in each of these auxiliary reservoirs will be much greater than in the larger central chamber.

During the charging operations—in which glass is drawn from the parent body into one or the other of the chambers $R_1$ or $R_2$—the full effect of the applied vacuum is exerted in inducing an inflow of glass through the ports 5 and 6; and the said chambers will, therefore, be filled very quickly even though these inlet openings (5 and 6) are of comparatively small size. In order to prevent "overfilling" these auxiliary reservoirs—and drawing molten material up into the air passages in the sleeve nuts 28 and 29—I preferably provide automatically operated float valves (or equivalent devices) to shut off the vacuum application as soon as the glass has reached a predetermined upper level in the chamber. As here shown these automatic cut off valves comprise a hollow cylinder 56, (of graphite or of some metal not injuriously affected by molten glass), which is suspended on a small valve stem that slides loosely in the central perforated hub of the sleeve nut 28 (or 29), and is provided at its upper end with a head 57 that is adapted to seat against the lower end of the tubular bolt 26ª (or 27ª). When the glass rises to the desired height the float is moved upwardly and closes the passageway in the bolt connection 26ª (or 27ª); and a condition of hydrostatic, or hydro-dynamic equilibrium is at once established between the molten glass in the partially exhausted reservoir and the glass in the tank. The float valve element is thus left in a nicely balanced position; and as soon as pressure is admitted to the pipe connection above it, the valve will be opened by this pressure, and reestablish connection between the conduit 30 and the charged reservoir ($R_1$ or $R_2$).

The pressure which is applied to the accumulated charge in either reservoir ($R_1$ and $R_2$) does not exert its full effect in forcing that accumulation into the central delivery chamber D, because the supply passages 5 and 6 are always open, and a small portion of the previously accumulated mass will therefore return to the forehearth chamber. But the areas of the inlet ports (5 and 6) are so much smaller than that of the outlet ports 3 and 4 that this "back flow" will be very limited in amount—as compared with the forward flow through the discharge outlets—and will not substantially reduce the rate of extrusion from the delivery orifice F. In practice this limited back flow into the forehearth chamber is an advantage in maintaining an alternatively reversed movement of the glass along opposite walls of the forehearth chamber, and around the front of the bell member B. As indicated in Fig. II the back flow from the port 5 cooperates with the concurrent inflow through the port 6, in setting up a counter-clockwise circulatory movement of the glass at the front of the forehearth chamber; and in the succeeding cycle of action—when the glass is flowing rearwardly from the port 6 and forwardly toward the port 5, a reversed clockwise circulation of the molten material around the bell B. These alternately reversed current movements assist in maintaining a uniform thermal and physical condition in the parent pool of hot glass, and correspondingly improve the operation of the feeder. If desired the effect of the circulation of the glass in the vicinity of the delivery bell may be supplemented by suitable burners so positioned as to direct sheets of flame into the forehearth, (in the lines of the arrows 60—60 of Fig. II);—these burners being preferably located at different levels above the plane II—II of Fig. I, so that the currents of burning gas will pass each other in front of the bell, and flow backward around its sides into the rear portion of the chamber C and thence into the main tank.

I desire it to be understood that I have devised various structures and various procedures for producing and utilizing a continuously flowing stream of molten glass in connection with the formation of mold charges and in which the flow of glass through the delivery orifice is never less than a gravity flow under the existing head, and that various details of such procedure and such apparatus here illustrated and described but not claimed are claimed in my following copending applications 679,889, filed July 11, 1933, 687,043, filed August 28, 1933, 687,044, filed August 28, 1933, 716,626, filed March 21, 1934, and 716,627, filed March 21, 1934.

With this disclosure, of my principle of continuous-self-controlled delivery action, as a guide, those skilled in this art can recognize and appreciate the many advantages of its application to, and utilization in, various alternative and equivalent types of feeder construction; and will be able to devise other forms of apparatus which will embody—in whole or in part—the characteristic features of this invention. The specific illustration which I have here presented as exemplary of my present improvements is not therefore to be taken as limiting the scope thereof, save to the extent particularly defined in accompanying claims.

I claim:

1. A method of delivering a succession of mold charges, which consists in maintaining a column of molten glass over an orifice, continuously subjecting the column to an expelling force other than gravity, maintaining two supply bodies of molten glass, alternately subjecting said bodies to a force of greater intensity than the expelling force on said column to create a flow from said bodies to said column, and severing a charge from the stream issuing through said orifice.

2. A method of delivering a succession of charges of molten material from a mass of such material which consists in maintaining a pool of material over a submerged orifice, constantly subjecting the pool to an expelling force other than gravity, successively withdrawing a plurality of substantially segregated bodies of molten material from such mass of material, successively causing a flow from such bodies to said pool and severing a charge from the stream occasioned by such flow.

3. A method of delivering a succession of mold charges of molten glass which consists in maintaining a segregated body of molten glass above a submerged orifice, occasioning a flow through said orifice by continuously subjecting the body to an expelling force other than gravity, periodically replenishing the body of molten glass above the orifice and severing mold charges from the stream occasioned by each such flow, in timed relation with such replenishing.

4. A method of delivering a succession of mold charges from a mass of molten material which consists in separately withdrawing and partially segregating quotas of molten material from such mass, in successively occasioning a flow from such quotas to a segregated pool in open communication with a flow orifice and occasioning periodic increases in the gravity head of such pool, and severing the stream issuing from said orifice in timed relation with the changes of gravity head of said pool.

5. A method of producing a succession of mold charges from a mass of molten material, which consists in maintaining a pool of material above an orifice, continuously subjecting said pool to an expelling force of periodically varied intensity, and in continuously replenishing said pool by alternately withdrawing separate quotas of molten material from such mass and in discharging from one such quota into said pool while replenishing the other.

6. A method of producing a succession of mold charges from a mass of molten glass, which consists in maintaining a segregated body of glass above an orifice, continually replenishing said body by withdrawing a quota of glass from such mass and then forcing it into said segregated body while withdrawing a separate quota from such mass, subjecting such body to a continuously applied expelling force of lesser magnitude than applied to such quotas and severing a mold charge from such discharge.

7. In combination in a feeder, a receptacle for molten glass having a submerged orifice, a delivery chamber in open communication with said orifice, a pair of charging chambers communicating with said delivery chamber and with said receptacle, means for alternately closing the communication between said delivery chamber and said charging chambers, means for expelling glass from said charging chambers into said delivery chamber, means for introducing an expelling force to said delivery chamber, and means for periodically varying the intensity of such force.

8. In combination in a feeder, a delivery chamber, two charge chambers, means for alternately establishing communication between said delivery chamber and each of said charge chambers, means for alternately connecting each of said charge chambers to super and sub-atmospheric pressures, and means for continuously delivering super-atmospheric pressure to said delivery chamber.

9. In combination in a feeder, means for maintaining a pool of molten glass above an orifice, means for maintaining two supply bodies of molten glass for replenishing said pool, means for occasioning a flow from first one and then the other of such bodies into said pool, and means for subjecting the glass in said pool to an expelling force other than gravity in addition to the means for occasioning a flow from the supply bodies into said pool to discharge the glass in said pool through the orifice.

10. In combination in a feeder, a forehearth having a submerged orifice, a member within the forehearth having a delivery chamber in alignment with said orifice and a pair of charging chambers in ported communication with said forehearth and with said delivery chamber, means for alternately connecting said charging chambers to a source of vacuum to establish a flow from the forehearth into said charging chambers, means for expelling the material from one of said charging chambers into the delivery chamber while the other is being filled, and means for closing the port between the delivery chamber and the charging chamber being filled with the material.

11. In combination in a feeder, a delivery chamber having a glass submerged delivery orifice, means for introducing an expelling force to said chamber to maintain a continuous flow of molten glass through said orifice substantially greater than the gravity flow and means for periodically varying the intensity of such force to occasion a necking of the stream resulting from said flow while maintaining such flow.

12. In combination in a feeder, a delivery chamber having a submerged flow orifice, a plurality of charging chambers, means for successively establishing communication between said delivery chamber and each of said charging chambers, means for subjecting the glass within the delivery chamber to an expelling force, and means for successively moving the glass in said charging chambers into said delivery chamber to increase the gravity head over the orifice to supplement the expelling force in discharging the glass through the orifice.

13. A method of forming a succession of mold charges which comprises alternately connecting a delivery chamber with two charge chambers, and subjecting the charge chamber so connected to an expelling force while simultaneously evacuating the other of said chambers and constantly subjecting the delivery chamber to an expelling force other than gravity in addition to the expelling force applied to said charge chambers.

14. In combination with a forehearth for molten material having a submerged orifice, of a member within said forehearth having a delivery chamber in vertical alignment with said orifice, and a pair of charging chambers in ported communication with said delivery chamber and with the molten material in the forehearth, means for alternately connecting each of said chambers to super and sub-atmospheric pressures, means for continuously delivering super-atmospheric pressure to said delivery chamber, and means within said delivery chamber for alternately closing the port between the delivery chamber and the charging chamber connected to sub-atmospheric pressure.

15. In combination with a forehearth for molten material having a submerged orifice, of a member within said forehearth having a delivery chamber above said orifice, and a pair of charging chambers in ported communication with said delivery chamber and with the forehearth, valvular means for alternately closing the ports between said delivery chamber and each of said chambers, a double-acting valve for simultaneously introducing sub-atmospheric pressure into one of said charging chambers and super-atmospheric pressure into the other of said chambers, means for periodically reversing said double-acting valve, means for continuously connecting said delivery chamber to a source of super-atmospheric pressure, and means for periodically restricting said last-mentioned means to vary the intensity of the pressure delivered to said delivery chamber.

16. A method of producing a succession of mold charges from a mass of molten material which consists in maintaining a segregated pool of material over a submerged orifice, constantly subjecting such pool to an expelling force other than gravity, and periodically withdrawing a quantity of the material from the mass and delivering it to said pool to periodically increase the gravity head over said orifice.

17. A method of producing a succession of mold charges which consists in maintaining a pool of material over a submerged orifice, continuously subjecting such pool to an expelling force to move such material through the orifice at a speed greater than the normal gravity flow, and further augmenting the flow through the orifice by periodically increasing the gravity head of the material over the orifice.

18. A method of feeding molten glass in a pulsating stream through a submerged orifice which consists in periodically varying the level of the glass over the orifice while subjecting such glass to a constant expelling force other than gravity.

19. A method of feeding molten glass in a pulsating stream through an orifice which consists in subjecting the surface of the glass over said orifice to a constant expelling force in excess of atmospheric pressure and supplementing such expelling force by periodically increasing the gravity head over the orifice.

20. A method of feeding molten glass which consists in creating a pool of glass over a submerged discharge orifice, maintaining said pool under a constant expelling force other than gravity, and in periodically increasing the depth of the pool to increase the gravity head over said orifice and accelerate the flow therethrough.

21. A method of delivering successive charges of molten glass which consists in segregating a pool of glass over a submerged discharge orifice, maintaining said pool under a substantially constant super-atmospheric pressure periodically varying the gravity head over said orifice to vary the flow through the orifice and severing a mold charge from the stream flowing through said orifice in timed relation with such variations in gravity head.

22. A feeder for molten glass comprising a forehearth, a member in said forehearth having a delivery chamber and two charging chambers formed therein, said delivery chamber communicating with a discharge orifice and said charge chambers communicating with said delivery chamber and with said forehearth, a control member in said delivery chamber, means for alternately connecting each of the charging chambers to sources of fluid pressure and vacuum and means for introducing fluid pressure into said delivery chamber.

23. A feeder for molten glass comprising a forehearth, a member in said forehearth having a delivery chamber and two charging chambers formed therein, said delivery chamber communicating with a discharge orifice, each of said charging chambers having a port opening into the delivery chamber and a port opening into the forehearth, the ports opening into the delivery chamber being larger than the ports opening into the forehearth, a control member in said delivery chamber for alternately closing the ports leading from said delivery chamber to said charging chambers, means for alternately connecting each of the charging chambers to sources of fluid pressure and vacuum, and means for introducing fluid pressure into said delivery chamber.

24. The combination in a feeder, a receptacle for molten glass, a delivery chamber within said receptacle having a flow orifice in communication therewith, a pair of charging chambers communicating with said receptacle and with said delivery chamber, means for drawing glass from the body within said receptacle into said charging chambers, means for continuously introducing fluid pressure into said delivery chamber, and means for alternately cutting off communication between said delivery chamber and said charging chambers.

25. A method of forming a succession of charges of molten glass from a mass of molten glass which consists in maintaining a body of molten glass in communication with a flow orifice, maintaining a continuous flow of glass from said body through such orifice by alternately withdrawing from different portions of said body to form separate quotas and by alternately causing glass from the quotas so withdrawn to replenish such flow, and then in separating mold charges from such flow.

26. A method of forming a succession of mold charges from a mass of molten glass which consists in maintaining a body of molten glass above a flow orifice, subjecting said body to a continuous expelling force other than gravity, maintaining a continuous flow of glass from said body through such orifice by successively delivering glass to said body from quotas previously withdrawn from said mass and in dividing said flow into charges in timed relation with such deliveries to said body.

27. A method of forming a succession of mold charges from a mass of molten glass which consists in maintaining a segregated quantity of molten glass above an open flow orifice by alternately delivering glass thereto from quantities previously withdrawn from said mass, and in dividing the resulting flow through said orifice into a succession of mold charges.

28. A method of feeding molten glass in a suspended stream through an orifice which consists in withdrawing a quota of such material from a supply body, delivering glass from said quota to a pool maintained over the orifice while withdrawing another quota from said body, continuously subjecting the pool over the orifice to an expelling force and periodically reducing the intensity of the expelling force to produce a necking in the suspended stream.

29. A method of feeding molten glass in a suspended stream which consists in withdrawing a quota of material from a supply of molten glass, subjecting said quota to an expelling force to move it into a delivery position over said orifice while withdrawing another quota from said supply, continuously subjecting the material over the orifice to an expelling force of less intensity than said previously mentioned expelling force, and utilizing both forces to discharge the glass through the orifice.

30. A method of feeding molten glass in a suspended stream which consists in withdrawing a quota of material from a supply of molten glass, subjecting said quota to a force to move it to a delivery position over an orifice while simultaneously withdrawing another quota from said supply, subjecting the material over the orifice to an expelling force of less intensity than the force applied to such quota, utilizing both such forces to discharge the glass through the orifice and periodically varying the intensity of the combined forces to produce a variation in the flow of the suspended stream.

31. A method of feeding molten glass in a suspended stream which consists in withdrawing a quota of material from a supply of molten glass, utilizing said quota to replenish a previously segregated pool maintained in a delivery position over an orifice, subjecting the material over the orifice to an expelling force, utilizing both such forces to discharge the glass through the orifice and periodically varying the intensity of the combined forces to produce a necking in the stream.

32. A method of feeding molten glass in a suspended stream which consists in withdrawing a quota from a supply of molten glass, delivering glass from said quota to a pool maintained over an orifice while withdrawing another quota from said supply, subjecting the pool over the orifice to an expelling force of periodically varied intensity, and then delivering glass from the second quota into said pool while replenishing the first quota.

33. In a feeder for molten glass, a receptacle, a segregation chamber having an orifice formed in the bottom thereof, two quota chambers each having a delivery port communicating with said segregation chamber and an inlet port communicating with said receptacle, and means for drawing glass from said receptacle into each such quota chambers, and for delivering glass therefrom to said segregation chamber.

34. The combination in a feeder comprising means for maintaining a pool of glass above an orifice, means for maintaining two supply bodies of molten glass for replenishing said pool, means for occasioning a flow from first one and then the other of such bodies, means for subjecting the glass in such pool to an expelling force other than gravity in addition to the means for occasioning a flow from said supply bodies to said pool to discharge the glass in said pool through the orifice, and means for periodically varying the intensity of the expelling forces applied to the pool to produce a necking in the stream flowing through said orifice.

35. A feeder for molten glass comprising a forehearth, a member in said forehearth having a delivery chamber and two charging chambers formed therein, said delivery chamber communicating with the discharge orifice, each of said charging chambers having a port opening into the delivery chamber and a port opening into the forehearth, a control member for alternately closing the ports leading from the delivery chamber to said charging chambers, means for alternately connecting each of said charging chambers to sources of fluid pressure and vacuum, means for introducing fluid pressure into said delivery chamber, and means for periodically varying the intensity of the pressure introduced into said delivery chamber.

36. A method of forming a succession of mold charges from a mass of molten glass, which consists in maintaining a segregated body of such glass above a flow orifice, maintaining a continuous flow of glass from said body through said orifice by periodically withdrawing quotas of glass from such mass, subjecting each such quota so withdrawn to an expelling force to deliver glass thereof into said body to increase the gravity head thereof and to augment the flow through such orifice, and dividing the stream of glass issuing from the orifice into charges in timed relation with such deliveries.

37. In combination in a feeder for molten glass, a forehearth, an accumulation chamber associated with said forehearth, means for subjecting the interior of said chamber to vacuum pressure, means responsive to glass level within said chamber for controlling the application of such pressure thereto, a delivery chamber, a passage between said chambers, means for subjecting the delivery chamber to super-atmospheric pressure, and a valve means for closing said passage.

38. In combination in a feeder for molten glass, a forehearth, an accumulation chamber and a delivery chamber associated with said forehearth, a passage between said chambers for delivering glass from the accumulation to the delivery chamber, means for simultaneously drawing glass into the accumulator chamber and discharging glass from the delivery chamber, and a valve means for closing said passage during such discharge period.

39. A method of forming a succession of mold charges from a mass of molten glass, which consists in successively withdrawing quotas of glass from such mass, delivering glass from each such quota to a body of glass maintained over an open flow orifice, continuously maintaining a fluid pressure on such body, periodically reducing such pressure while still maintaining it above atmospheric pressure, and severing charges of molten glass from the stream issuing from such orifice in timed relation with such reduction of fluid pressure.

FRANK L. O. WADSWORTH.